United States Patent
Chen

(10) Patent No.: US 8,814,113 B1
(45) Date of Patent: Aug. 26, 2014

(54) SUCKER WITH PRESSURE EARLY WARNING DETECTION FUNCTION

(71) Applicant: Kuei-I Chen, Xiushi Township, Changhua County (TW)

(72) Inventor: Kuei-I Chen, Xiushi Township, Changhua County (TW)

(73) Assignee: Tru-Miles Hardware Co., Ltd., Changhua County (TW)

( * ) Notice: Subject to any disclaimer, the term of this patent is extended or adjusted under 35 U.S.C. 154(b) by 0 days.

(21) Appl. No.: 13/798,279

(22) Filed: Mar. 13, 2013

(51) Int. Cl.
*A45D 42/14* (2006.01)

(52) U.S. Cl.
USPC .................................... 248/205.5; 248/309.3

(58) Field of Classification Search
USPC ............... 248/683, 467, 205.5, 205.7, 206.2, 248/309.3, 363; 269/21; 40/597; 362/397; 294/183
See application file for complete search history.

(56) References Cited

U.S. PATENT DOCUMENTS

| | | | |
|---|---|---|---|
| 7,542,797 B2* | 6/2009 | Moon | 607/2 |
| 2003/0197609 A1* | 10/2003 | Liu | 340/566 |
| 2006/0247730 A1* | 11/2006 | Moon | 607/46 |
| 2006/0247813 A1* | 11/2006 | Takahashi | 700/95 |

* cited by examiner

Primary Examiner — Alfred J Wujciak
(74) Attorney, Agent, or Firm — Alan D. Kamrath; Kamrath IP Lawfirm, P.A.

(57) ABSTRACT

A sucker includes a sucker body, a pressure sensor, a control circuit board, and a warning member. The sucker body has an attachment surface. The control circuit board and the warning member are combined with the pressure sensor. The pressure sensor, the control circuit board and the warning member are mounted in a closed receiving portion. The pressure sensor is connected to the attachment surface of the sucker body. Thus, the pressure sensor, the control circuit board and the warning member construct an early warning detection mechanism which successively detects and monitors the pressure of the attachment surface of the sucker body, and produces an early warning signal automatically by detection of the pressure differential of the attachment surface of the sucker body to prevent the sucker from being detached from an object.

6 Claims, 5 Drawing Sheets

SUCKER WITH PRESSURE EARLY WARNING DETECTION FUNCTION

BACKGROUND OF THE INVENTION

1. Field of the Invention

The present invention relates to an attachment device and, more particularly, to a sucker for attaching an article to an object, such as a wall and the like.

2. Description of the Related Art

A conventional sucker comprises an attachment surface that is bonded onto an object, such as a wall, plane and the like, to attach an article to the object. However, when ambient air enters the inside of the sucker, the negative pressure in the sucker is reduced or released, so that the sucker is easily detached or removed from the object, and the article easily falls down. In addition, the user cannot predict reduction or release of the suction force of the sucker so that the sucker is easily detached from the object unexpectedly, thereby causing inconvenience or danger to the user.

BRIEF SUMMARY OF THE INVENTION

In accordance with the present invention, there is provided a sucker, comprising a sucker body, a pressure sensor connected with the sucker body, a control circuit board connected with the pressure sensor, and a warning member connected with the control circuit board. The sucker body has an attachment surface. The control circuit board and the warning member are combined with the pressure sensor. The pressure sensor, the control circuit board and the warning member are mounted in a closed receiving portion. The pressure sensor is connected to the attachment surface of the sucker body. In practice, the pressure sensor successively detects and reacts a vacuum leak variation of the attachment surface of the sucker body, and transmits the vacuum leak variation of the attachment surface of the sucker body to the control circuit board. The control circuit board converts the vacuum leak variation of the attachment surface of the sucker body into a feedback signal, and converts the feedback signal into an early warning signal. The control circuit board transmits the early warning signal to the warning member which displays or starts the early warning signal. Thus, the sucker performs an early warning action to provide a safety function.

The sucker further comprises a wireless transceiver connected with the control circuit board, and a digital faceplate connected with the control circuit board to receive a remote wireless signal. Thus, the wireless transceiver transmits the pressure differential from the control circuit board, and the digital faceplate receives the remote wireless signal from the wireless transceiver and indicates the pressure differential in the closed receiving portion of the sucker body.

The sucker body has a periphery provided with an air hole connected between the closed receiving portion and the attachment surface of the sucker body to connect the closed receiving portion to the attachment surface of the sucker body. The closed receiving portion is directly formed in the sucker body. Alternatively, the closed receiving portion is connected with an outer receiving portion which is located outside of the sucker body. Thus, the attachment surface of the sucker body is attached to an object, with the closed receiving portion and the attachment surface of the sucker body forming a closed chamber detection zone.

The sucker further comprises a pull-type handle or an eccentric handle pivotally connected with the sucker body. The handle is connected to the closed receiving portion.

The pressure sensor is directly received in the closed receiving portion or placed in the outer receiving portion of the sucker body.

The sucker further comprises a digital display mounted outside of the sucker body and connected with the pressure sensor to indicate the pressure differential in the closed receiving portion of the sucker body.

The primary objective of the present invention is to provide a sucker with a pressure early warning detection function.

According to the primary advantage of the present invention, the pressure sensor, the control circuit board and the warning member construct an early warning detection mechanism which successively detects and monitors the pressure of the attachment surface of the sucker body, and produces an early warning signal automatically by detection of the pressure differential of the attachment surface of the sucker body so as to prevent the sucker from being detached from the object, and to provide a safety function to the user.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
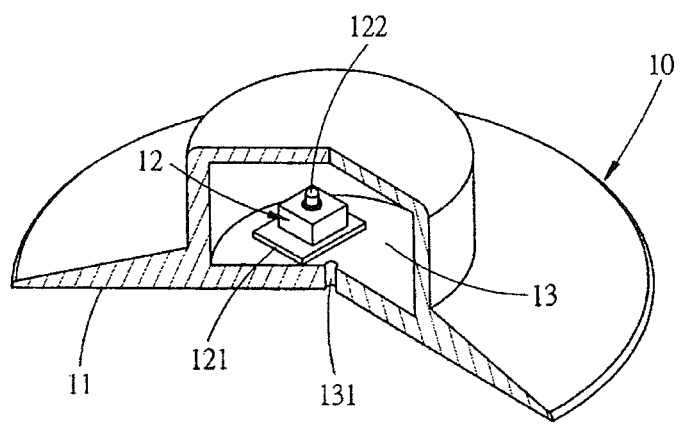
FIG. 1 is a perspective cross-sectional view of a sucker in accordance with the preferred embodiment of the present invention.
Figure 2:
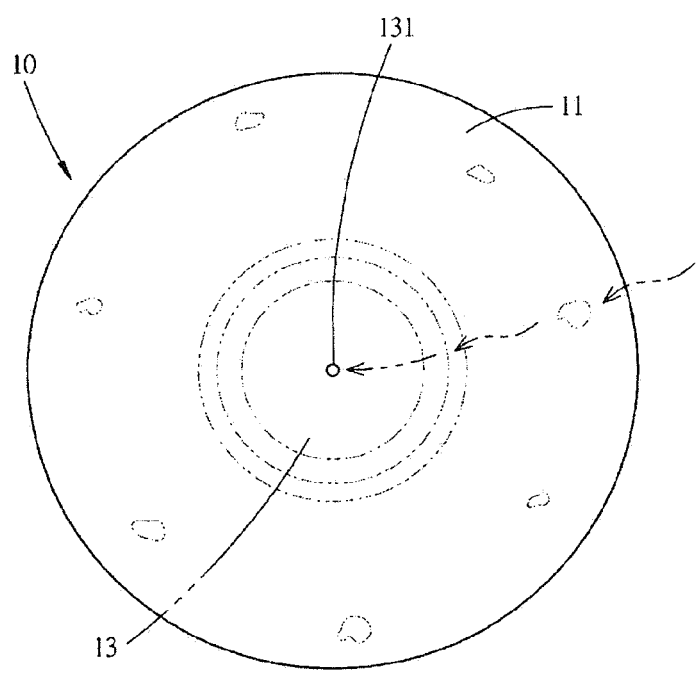
FIG. 2 is a bottom operational view of the sucker as shown in FIG. 1.
Figure 3:
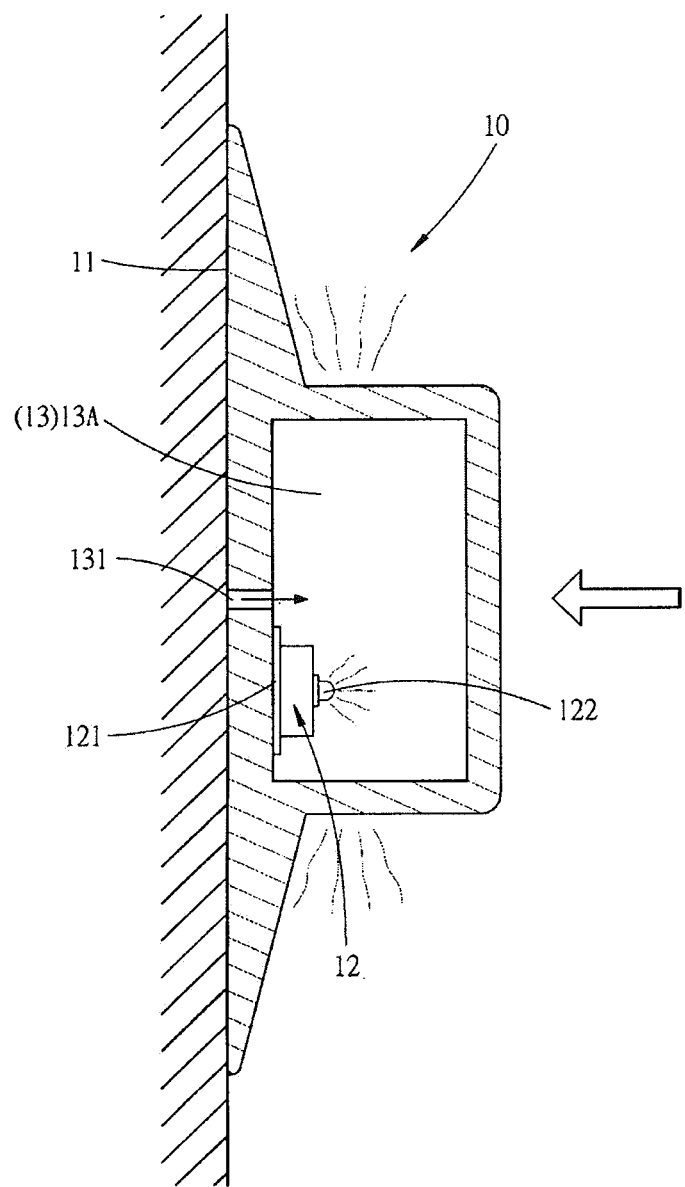
FIG. 3 is a side cross-sectional operational view of the sucker as shown in FIG. 1.

Referring to the drawings and initially to FIGS. 1-3, a sucker in accordance with the preferred embodiment of the present invention comprises a sucker body 10, a pressure sensor 12 connected with the sucker body 10, a control circuit board 121 connected with the pressure sensor 12, and a warning member 122 connected with the control circuit board 121. The sucker body 10 has an attachment surface 11. The attachment surface 11 of the sucker body 10 is formed on the bottom of the sucker body 10 and has a substantially planar or concave shape. The control circuit board 121 and the warning member 122 are combined with the pressure sensor 12. The pressure sensor 12, the control circuit board 121 and the warning member 122 are mounted in a closed receiving portion 13. The closed receiving portion 13 is integrally formed in the sucker body 10. The pressure sensor 12 is connected to the attachment surface 11 of the sucker body 10.

In practice, the pressure sensor 12 successively detects and reacts a vacuum leak variation of the attachment surface 11 of the sucker body 10, and transmits the vacuum leak variation of the attachment surface 11 of the sucker body 10 to the control circuit board 121. The control circuit board 121 converts the vacuum leak variation of the attachment surface 11 of the sucker body 10 into a feedback signal, and converts the feedback signal into an early warning signal. The control circuit board 121 then transmits the early warning signal to the warning member 122 which displays or starts the early warning signal. Thus, the sucker performs an early warning action to provide a safety function.

In the preferred embodiment of the present invention, the sucker body 10 has a periphery provided with an air hole 131 connected between the closed receiving portion 13 and the attachment surface 11 of the sucker body 10 to connect the closed receiving portion 13 to the attachment surface 11 of the sucker body 10. Thus, when the attachment surface 11 of the sucker body 10 is attached to an object, the closed receiving portion 13 and the attachment surface 11 of the sucker body 10 form a closed chamber detection zone 13A.

In operation, referring to FIGS. 2 and 3 with reference to FIG. 1, the attachment surface 11 of the sucker body 10 is initially attached to an object closely, to form a vacuum suction state between the attachment surface 11 of the sucker body 10 and the object. At this time, the closed receiving portion 13 and the attachment surface 11 of the sucker body 10 form a closed chamber detection zone 13A. In addition, the pressure sensor 12 is connected to the attachment surface 11 of the sucker body 10 so that the pressure sensor 12 can detect the pressure of the suction force at the attachment surface 11 of the sucker body 10, and the control circuit board 121 operates the pressure differential of the attachment surface 11 of the sucker body 10. In such a manner, when air permeates the attachment surface 11 of the sucker body 10 into the closed chamber detection zone 13A, the pressure sensor 12 successively detects the pressure of the attachment surface 11 of the sucker body 10 and transmits a pressure differential to the control circuit board 121. Then, the control circuit board 121 compares the pressure differential of the attachment surface 11 of the sucker body 10 with a preset pressure limit. When the pressure differential of the attachment surface 11 of the sucker body 10 reaches the preset pressure limit, the control circuit board 121 drives the warning member 122 to emit an early warning signal to warn a user so that the user predicts that the suction force of the sucker body 10 is exhausted and has to supplement the vacuum negative pressure suction force in the closed chamber detection zone 13A so as to prevent the sucker body 10 from being detached from the object. Thus, the sucker can monitor and detect its pressure and can produce an early warning signal automatically by detection of a pressure differential so as to provide a safety function to the user.

In the preferred embodiment of the present invention, the closed receiving portion 13 is directly formed in the sucker body 10. Alternatively, the closed receiving portion 13 is connected with an outer receiving portion (not shown) which is located outside of the sucker body 10 to form a closed chamber detection zone. The pressure sensor 12 is directly received in the closed receiving portion 13 or placed in the outer receiving portion of the sucker body 10. The warning member 122 is an light emitting diode (LED) light source, an audio alarm, a buzzer and the like.

In another preferred embodiment of the present invention, the sucker further comprises a digital display (not shown) mounted outside of the sucker body 10 and connected with the pressure sensor 12 to indicate the pressure differential in the closed receiving portion 13 of the sucker body 10.

In another preferred embodiment of the present invention, the sucker further comprises a wireless transceiver (not shown) connected with the control circuit board 121, and a digital faceplate (not shown) connected with the control circuit board 121 to receive a remote wireless signal. Thus, the wireless transceiver transmits the pressure differential from the control circuit board 121, and the digital faceplate receives the remote wireless signal from the wireless transceiver and indicates the pressure differential in the closed receiving portion 13 of the sucker body 10.

Figure 4:
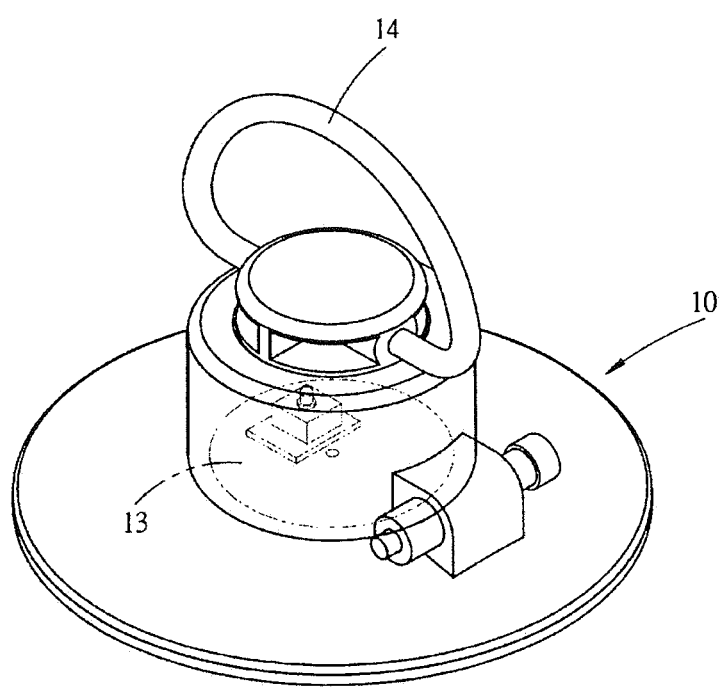
FIG. 4 is a perspective view of a sucker in accordance with another preferred embodiment of the present invention.

As shown in FIG. 4, the sucker further comprises a pull-type handle 14 pivotally connected with the sucker body 10. The handle 14 is connected to the closed receiving portion 13. Thus, when the handle 14 is pulled outward relative to the sucker body 10, the closed receiving portion 13 is disposed at a vacuum state so that the attachment surface 11 of the sucker body 10 is attached to the object by a vacuum suction force.

Figure 5:
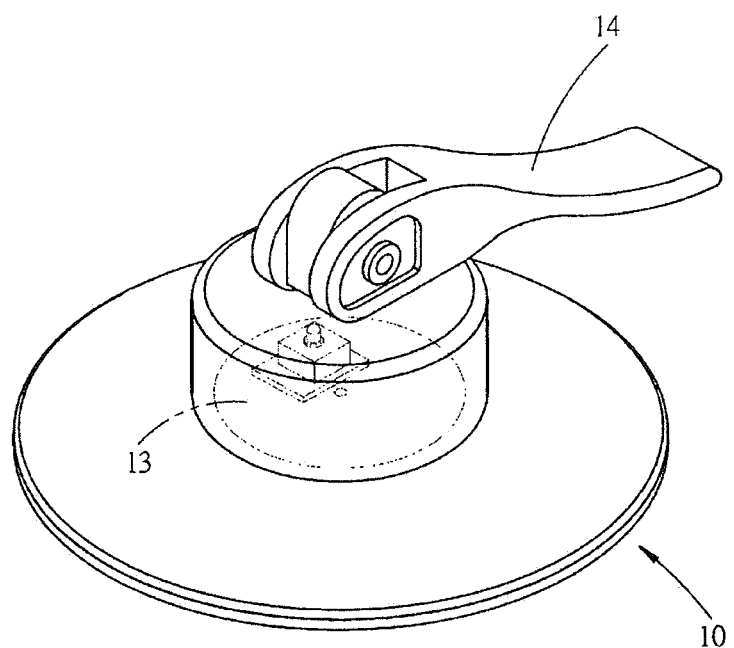
FIG. 5 is a perspective view of a sucker in accordance with another preferred embodiment of the present invention.

As shown in FIG. 5, the sucker further comprises an eccentric handle 14 pivotally connected with the sucker body 10. The handle 14 is connected to the closed receiving portion 13. Thus, when the handle 14 is pulled outward relative to the sucker body 10 in an eccentric manner, the closed receiving portion 13 is disposed at a vacuum state so that the attachment surface 11 of the sucker body 10 is attached to the object by a vacuum suction force.

Accordingly, the pressure sensor 12, the control circuit board 121 and the warning member 122 construct an early warning detection mechanism which successively detects and monitors the pressure of the attachment surface 11 of the sucker body 10, and produces an early warning signal automatically by detection of the pressure differential of the attachment surface 11 of the sucker body 10 so as to prevent the sucker from being detached from the object, and to provide a safety function to the user.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A sucker for attaching an article to an object with an early warning detection function, comprising:
   a sucker body;
   a pressure sensor connected with the sucker body;
   a control circuit board connected with the pressure sensor; and
   a warning member connected with the control circuit board; wherein:
   the sucker body has an attachment surface;
   the control circuit board and the warning member are combined with the pressure sensor;
   the pressure sensor, the control circuit board and the warning member are mounted in a closed receiving portion;
   the pressure sensor is connected to the attachment surface of the sucker body;
   the pressure sensor successively detects and reacts a vacuum leak variation of the attachment surface of the sucker body, and transmits the vacuum leak variation of the attachment surface of the sucker body to the control circuit board;
   the control circuit board converts the vacuum leak variation of the attachment surface of the sucker body into a feedback signal, and converts the feedback signal into an early warning signal;
   the control circuit board transmits the early warning signal to the warning member which displays or starts the early warning signal; and
   the sucker performs an early warning action to provide a safety function.

2. The sucker of claim 1, wherein:
   the sucker further comprises:
   a wireless transceiver connected with the control circuit board; and a digital faceplate connected with the control circuit board to receive a remote wireless signal;

the wireless transceiver transmits the pressure differential from the control circuit board; and the digital faceplate receives the remote wireless signal from the wireless transceiver and indicates the pressure differential in the closed receiving portion of the sucker body.

3. The sucker of claim 1, wherein:

the sucker body has a periphery provided with an air hole connected between the closed receiving portion and the attachment surface of the sucker body to connect the closed receiving portion to the attachment surface of the sucker body;

the closed receiving portion is directly formed in the sucker body;

the closed receiving portion is connected with an outer receiving portion which is located outside of the sucker body; and the attachment surface of the sucker body is attached to an object, with the closed receiving portion and the attachment surface of the sucker body forming a closed chamber detection zone.

4. The sucker of claim 1, wherein:

the sucker further comprises a pull-type handle or an eccentric handle pivotally connected with the sucker body; and the handle is connected to the closed receiving portion.

5. The sucker of claim 3, wherein the pressure sensor is directly received in the closed receiving portion or placed in the outer receiving portion of the sucker body.

6. The sucker of claim 1, wherein the sucker further comprises a digital display mounted outside of the sucker body and connected with the pressure sensor to indicate the pressure differential in the closed receiving portion of the sucker body.

* * * * *